US011066117B2

(12) United States Patent
Hu

(10) Patent No.: US 11,066,117 B2
(45) Date of Patent: Jul. 20, 2021

(54) BICYCLE INDUCTIVE LOCK

(71) Applicant: Yuan Wen Shing Industries Corp., Chang-Hua (TW)

(72) Inventor: Ching-Huang Hu, Chang-Hua (TW)

(73) Assignee: YUAN WEN SHING INDUSTRIES CORP., Chang-Hua (TW)

( * ) Notice: Subject to any disclaimer, the term of this patent is extended or adjusted under 35 U.S.C. 154(b) by 337 days.

(21) Appl. No.: 16/262,866

(22) Filed: Jan. 30, 2019

(65) Prior Publication Data

US 2020/0023917 A1 Jan. 23, 2020

(30) Foreign Application Priority Data

Jul. 18, 2018 (TW) .................................. 107209702

(51) Int. Cl.

| | |
|---|---|
| *B62H 5/00* | (2006.01) |
| *E05B 17/10* | (2006.01) |
| *E05B 47/00* | (2006.01) |
| *E05B 71/00* | (2006.01) |
| *B62H 5/14* | (2006.01) |
| *B62J 99/00* | (2020.01) |
| *B62J 45/00* | (2020.01) |

(52) U.S. Cl.
CPC ................ *B62H 5/00* (2013.01); *B62J 99/00* (2013.01); *E05B 17/10* (2013.01); *E05B 47/0012* (2013.01); *E05B 71/00* (2013.01); *B62J 45/00* (2020.02)

(58) Field of Classification Search
CPC .......... B62H 5/00; B62H 5/003; B62H 5/147; B62H 5/14; B62H 5/141; B62J 99/00; B62J 45/00; E05B 17/10; E05B 47/0012; E05B 71/00; E05B 47/0603; E05B 2047/0024; E05B 2047/0067
USPC ... 70/38 R, 48, 233, 234, 277, 278.1, 278.7, 70/279.1, 282
See application file for complete search history.

(56) References Cited

U.S. PATENT DOCUMENTS

| | | | | |
|---|---|---|---|---|
| 2,647,390 | A | * | 8/1953 | Paulson ................. B62H 5/147 70/227 |
| 3,965,709 | A | * | 6/1976 | Belke ..................... B62H 5/003 70/227 |
| 4,033,160 | A | * | 7/1977 | Mima .................... B62H 5/003 70/233 |
| 5,197,310 | A | * | 3/1993 | Pedersen ............... B62H 5/003 70/227 |

(Continued)

*Primary Examiner* — Lloyd A Gall
(74) *Attorney, Agent, or Firm* — Raymond Y. Chan; David and Raymond Patent Firm

(57) ABSTRACT

A bicycle inductive lock included a housing, a lock body, and a control circuit device. An annular latch and the lock body are disposed in the housing. A back cover is configured to close the housing. The annular latch has a first engaging groove, a second engaging groove and a third engaging groove. The lock body includes a first baffle that can be engaged in the first engaging groove or the second engaging groove, a second baffle that can be engaged in third engaging groove, and a speed reduction motor having a lever. The lever includes an angle control block and an eccentric paddle. The control circuit device includes an induction unit and a key fob. The key fob is configured to generate induction with the induction unit for transmitting a signal. With the above configuration, the bicycle inductive lock can sense the signal to be locked or unlocked.

10 Claims, 14 Drawing Sheets

(56) References Cited

U.S. PATENT DOCUMENTS

| | | | | |
|---|---|---|---|---|
| 5,291,761 | A * | 3/1994 | Lii | B62H 5/003 |
| | | | | 70/18 |
| 9,512,649 | B2 * | 12/2016 | Mohamed | E05B 47/023 |
| 9,932,759 | B2 * | 4/2018 | Mohamed | E05B 39/005 |
| 10,370,869 | B2 * | 8/2019 | Yang | E05B 9/00 |
| 2018/0015974 | A1 * | 1/2018 | Yang | B62H 5/20 |
| 2020/0070912 | A1 * | 3/2020 | Muller | E05B 71/00 |
| 2020/0071966 | A1 * | 3/2020 | Hentschel | E05B 55/00 |

* cited by examiner

US 11,066,117 B2

BICYCLE INDUCTIVE LOCK

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a bicycle inductive lock, and more particularly a bicycle lock that is locked or unlocked by means of induction.

Description of Related Arts

Bicycles are very convenient and popular for our daily life. In order to prevent theft, bicycle owners may use various locks (e.g., horseshoe lock, chain locks . . . ) as anti-theft locks. In order to make it safe and easy to use, there is a smart bicycle electronic lock having a gear-type rotary switch lock structure that does not need to use a key, as shown in FIG. 1 through FIG. 3. The smart bicycle electronic lock comprises a housing 10. The housing 10 is mounted on a bicycle frame at a position corresponding to a bicycle wheel. A control unit 11 is disposed in the housing 10. The control unit 11 includes a control module 12. The control module 12 is connected with an RFID module 13. The RFID module 13 is inductively controlled by a RFID card of the user. The control module 12 is connected with a GPS positioning module 14. The GPS positioning module 14 is configured to perform satellite positioning on the location of the bicycle electronic lock. A GSM module 15 is connected to the control module 12. The GSM module 15 is configured to send a related message to the user's mobile device. The control module 12 is connected with a power source 16. The power source 16 is connected with a rotating gear 17. The power source 16 drives the rotating gear 17 to rotate. A locking member 18 is provided in the housing 10, corresponding to the wheel spoke of the bicycle. The locking member 18 is formed with a toothed portion 181 corresponding to the rotating gear 17. The toothed portion 181 of the locking member 18 is configured to engage with the rotating gear 17. Thereby, the power source 16 drives the locking member 18 to move for performing locking or unlocking through the rotating gear 17. However, the above structure has the convenient function of not using a key, but the locking and unlocking of the locking member 18 are performed by means of induction. In general, the user always carries the RFID card with him. In this way, there may be a wrong induction at any time or during riding. If the locking member 18 is activated to be locked by mistake, a serious injury may occur. Moreover, the installation of the GPS positioning module 14 and the GSM module 15 actually causes a large amount of power consumption. If the battery is exhausted, it is impossible to perform locking and unlocking, so it is not practical.

SUMMARY OF THE PRESENT INVENTION

The primary object of the present invention is to solve the above problems and to provide a bicycle inductive lock that has better convenience and is practical. The bicycle inductive lock comprises a housing, a lock body, and a control circuit device. The lock body is disposed in an upper section of the housing. The lock body has a first slot for accommodating a first baffle, a second slot for accommodating a second baffle, a motor accommodating groove for accommodating a speed reduction motor, a first groove for accommodating a first inductive switch, and a second groove for accommodating a second inductive switch. The control circuit device includes a control unit, an induction unit, a power unit, and a key fob. The key fob enables the induction unit to sense a signal, thereby driving the speed reduction motor to move the first baffle and the second baffle to form a lockable state or an unlockable state. When in use, the bicycle inductive lock can cooperate with a steel cable to achieve the effect of locking and unlocking.

According to the above object of the present invention, a bicycle inductive lock is provided. The bicycle inductive lock comprises a housing, a lock body, and a control circuit device. The housing has an accommodating portion recessed in an upper section and a rail portion recessed in a lower section. A lower end of the rail portion has an opening. An annular latch and a tension spring are disposed in the rail portion. The annular latch has a first engaging groove, a second engaging groove, a third engaging groove, and a linking handle. The first engaging groove and the second engaging groove are disposed axially, respectively. The third engaging groove is disposed radially. The tension spring has one end coupled to the annular latch and another end coupled to the rail portion. A back cover is configured to cover the housing. The lock body is disposed in the accommodating portion. A lower end of the lock body is formed with an annular groove corresponding to the rail portion. The lock body includes a first slot for accommodating a first baffle. The first baffle is movable horizontally in a lateral direction of the annular groove. One side of the first baffle, corresponding to the annular groove, has a lower protrusion. The first baffle is provided with a first through hole. The first through hole has an inner flange. The lower protrusion is elastically pressed against the annular latch to be engaged in the first engaging groove or the second engaging groove. A second slot for accommodating a second baffle is disposed at one side of the first slot. The second baffle is movable vertically in a top direction of the annular groove. A lower end of the second slot is in communication with the annular groove. The second baffle is pressed against the annular latch to be engaged in the third engaging groove. One side of the second baffle, away from the annular groove, has a lower notch at a lower end. Another side of the second baffle, opposite to the lower notch, is provided with an upper end flange. A motor accommodating groove for accommodating a speed reduction motor is disposed at one side of the second slot away from the first slot. A front end of the speed reduction motor has a rotatable lever. The lever passes through the second baffle and the first baffle. The lever includes an angle control block and an eccentric paddle. The angle control block has a first side protrusion, a second side protrusion and a third side protrusion that are arranged radially. The eccentric paddle has a wide section and a narrow section. The wide section is inserted through the lower notch of the second baffle. The narrow section is inserted through the first through hole of the first baffle. A first groove for accommodating a first inductive switch is disposed between the second slot and the motor accommodating groove. The first inductive switch is located above the angle control block for commanding the first side protrusion, the second side protrusion or the third side protrusion to touch or not to touch the first inductive switch. A second groove for accommodating a second inductive switch is disposed on a back of the lock body. The second inductive switch is located under the upper end flange of the second baffle for commanding the upper end flange to touch or not to touch the second inductive switch. The control circuit device includes a control unit, an induction unit, a power unit, and a key fob. The induction unit and the power unit are electrically connected to the control unit, respectively. The control unit is electrically connected to the first inductive switch, the second inductive switch and the speed reduction motor, respectively. The key fob is being configured to generate induction with the induction unit for transmitting a signal to the control unit to drive the speed reduction motor to rotate clockwise or counterclockwise.

In an embodiment of the present invention, the lock body further includes a receiving hole, an inverse U-shaped groove, a third groove, and a fourth groove. The receiving hole is configured to receive an insertion head of a steel cable and is defined in one side of the lock body. One side of the upper section of the housing is formed with a perforation communicating with the accommodating portion. The receiving hole corresponds to the perforation. A front end of the insertion head has a tapered surface and a shaft groove. The inverse U-shaped groove is configured to accommodate an inverse U-shaped baffle and is disposed at another side of the first slot away from the second slot. The inverse U-shaped baffle is movable vertically in the inverse U-shaped groove. The inverse U-shaped baffle has a first end edge at one end and a second end edge at another end. The first end edge leans against the narrow section of the eccentric paddle. The receiving hole is in communication with the inverse U-shaped groove. The second end edge is located above the insertion head. The inverse U-shaped baffle is elastically pressed downwardly so that the second end edge extends into the receiving hole to elastically press against the insertion head for the second end edge to be engaged or not to be engaged in the shaft groove of the insertion head. The third groove is pivotally connected with a rotating member. The third groove is disposed under the receiving hole. The third groove is in communication with the receiving hole. One side of the rotating member is provided with a left raised portion. Another side of the rotating member is provided with a right raised portion. The fourth groove is configured to accommodate a third inductive switch and is disposed above the third groove. The control unit is electrically connected to the third inductive switch. The right raised portion of the rotating member is elastically pressed to be engaged or not to be engaged in the receiving hole. The left raised portion is configured to touch or not to touch the third inductive switch.

In an embodiment of the present invention, the third groove is provided with a circular post, the rotating member has a shaft hole, and the circular post is pivoted to the shaft hole.

In an embodiment of the present invention, a lateral protruding plate is disposed below the first end edge. The inverse U-shaped groove has an enlarged groove that is parallel to the first end edge and located above the lateral protruding plate. A spring is disposed in the enlarged groove to support the lateral protruding plate.

In an embodiment of the present invention, an inner side of the third groove is provided with a stop wall. A stepped edge is disposed below the right raised portion. A spring is disposed between the stepped edge and the stop wall.

In an embodiment of the present invention, another side of the first baffle, opposite to the lower protrusion, is provided with an L-shaped bent lateral extension plate. The second baffle has an upper notch corresponding to the lateral extension plate.

In an embodiment of the present invention, the first slot is provided with a first circular groove defined in a front of the lock body. The first baffle has a recess corresponding to the first circular groove. A spring is disposed between the first circular groove and the recess to support the first baffle.

In an embodiment of the present invention, the second slot is provided with a second circular groove that is vertically parallel to the second slot. The second baffle is provided with a second through hole corresponding to the second circular groove. A spring is disposed in the second circular groove, and the spring leans against a lower end of the second through hole.

In an embodiment of the present invention, a distal end of the narrow section of the eccentric paddle is provided with a rotating shaft. The lock body further has a third slot for accommodating a shaft plate member. The third slot is disposed at another side of the first slot away from the second slot. The shaft plate member is composed of two symmetrical shaft plates. The two shaft plates have a pair of arc notches. The rotating shaft is pivoted in the pair of arc notches.

In an embodiment of the present invention, the induction unit has an induction coil, an infrared sensor, and an LED light.

With the above configuration, the bicycle inductive lock can sense the signal and thereby drive the eccentric paddle to toggle the first baffle, the second baffle and the inverse U-shaped baffle to be in a lockable or unlockable state, and can cooperate with the steel cable when in use to achieve the effect of locking and unlocking.

DETAILED DESCRIPTION OF THE PREFERRED EMBODIMENT

Figure 1:
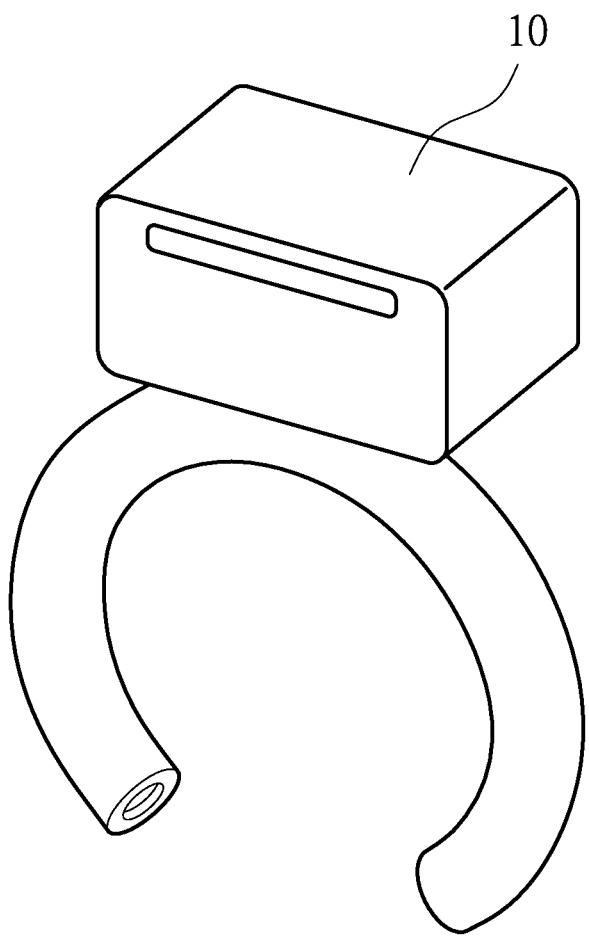
FIG. 1 is a perspective view of a conventional lock.
Figure 2:
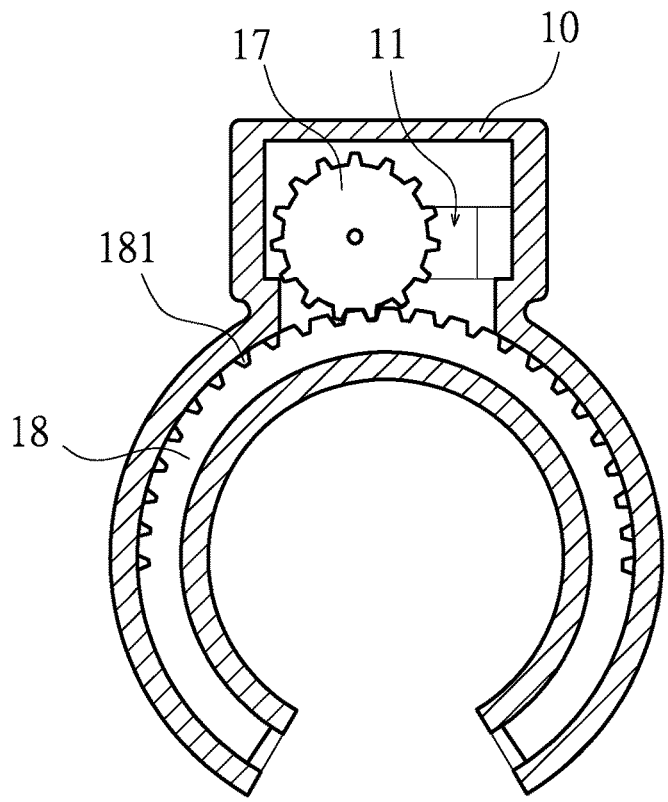
FIG. 2 is a cross-sectional view of the conventional lock.
Figure 3:
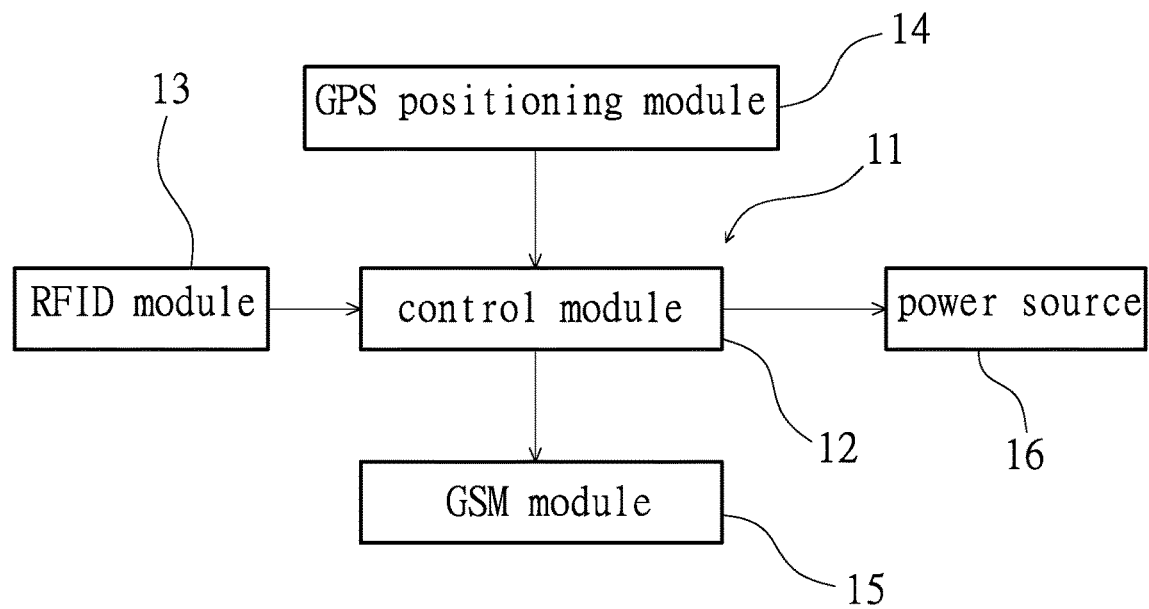
FIG. 3 is a block diagram of the control unit of the conventional lock.
Figure 4:
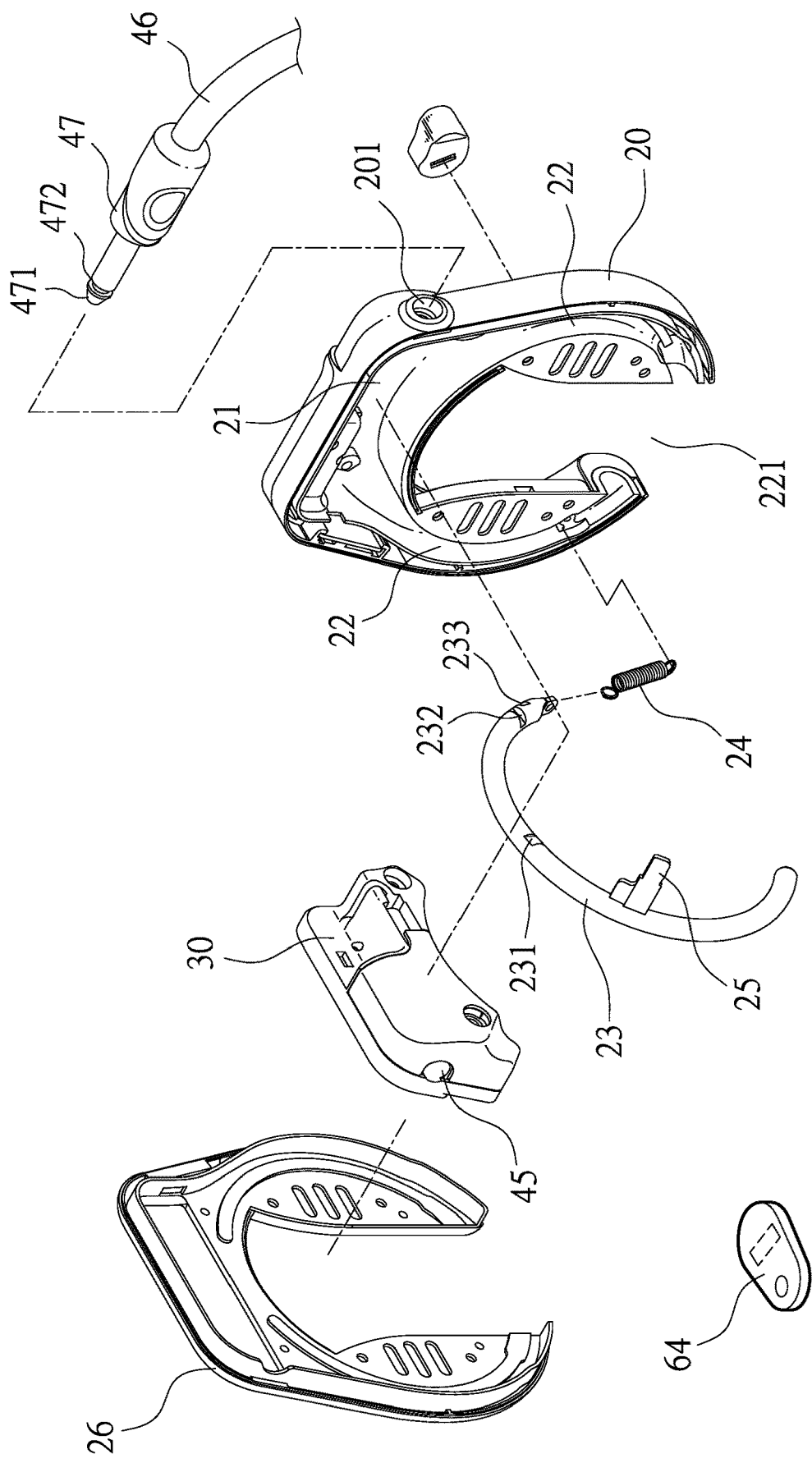
FIG. 4 is an exploded view of the present invention.
Figure 5:
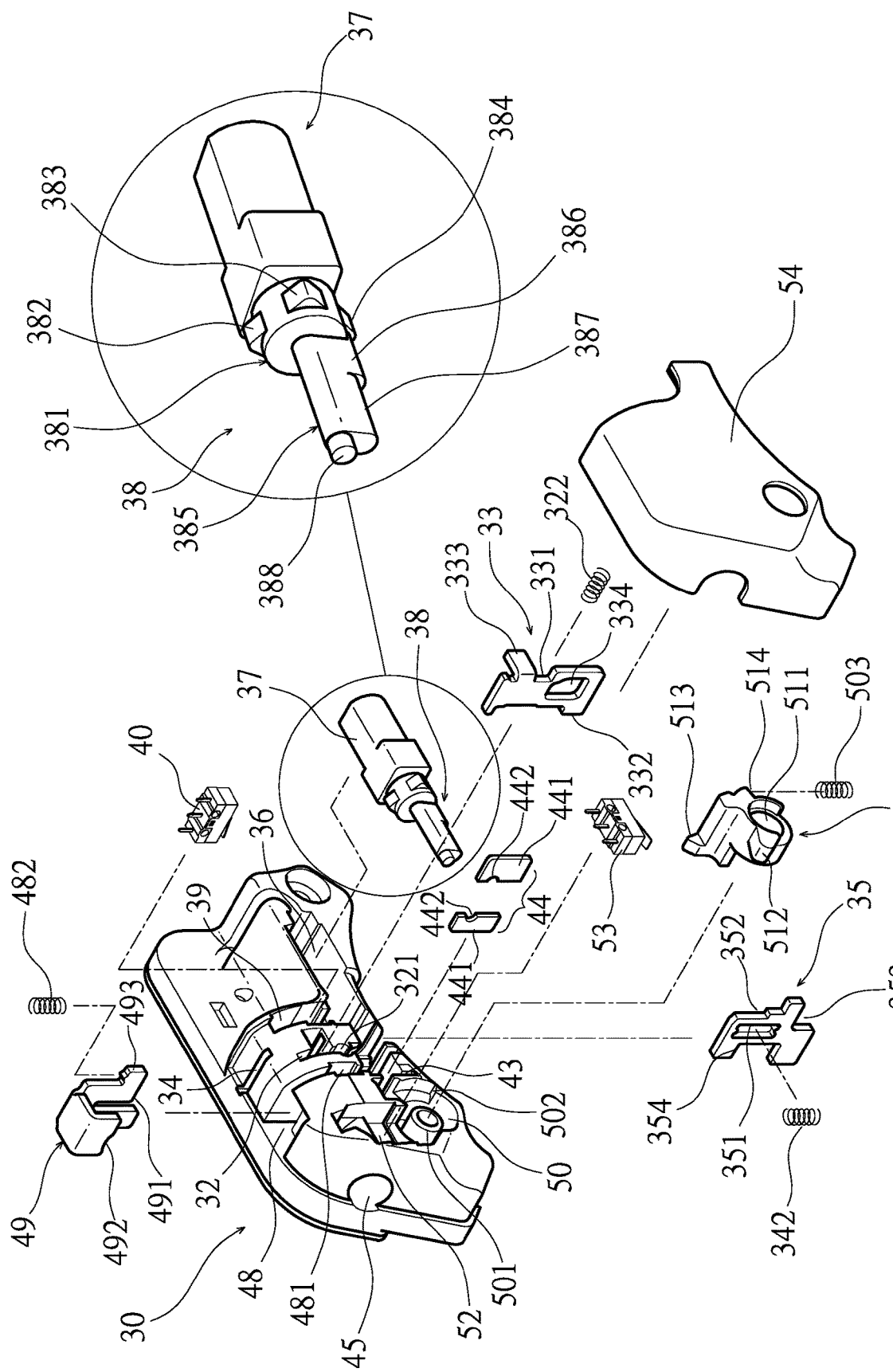
FIG. 5 is a front exploded view of the lock body of the present invention.
Figure 6:
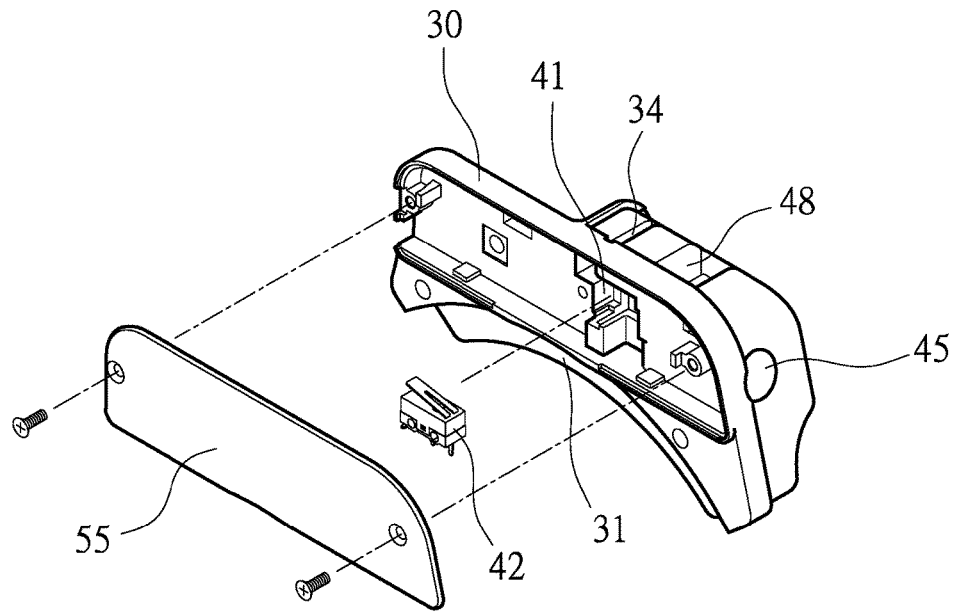
FIG. 6 is a rear exploded view of the lock body of the present invention.
Figure 7:
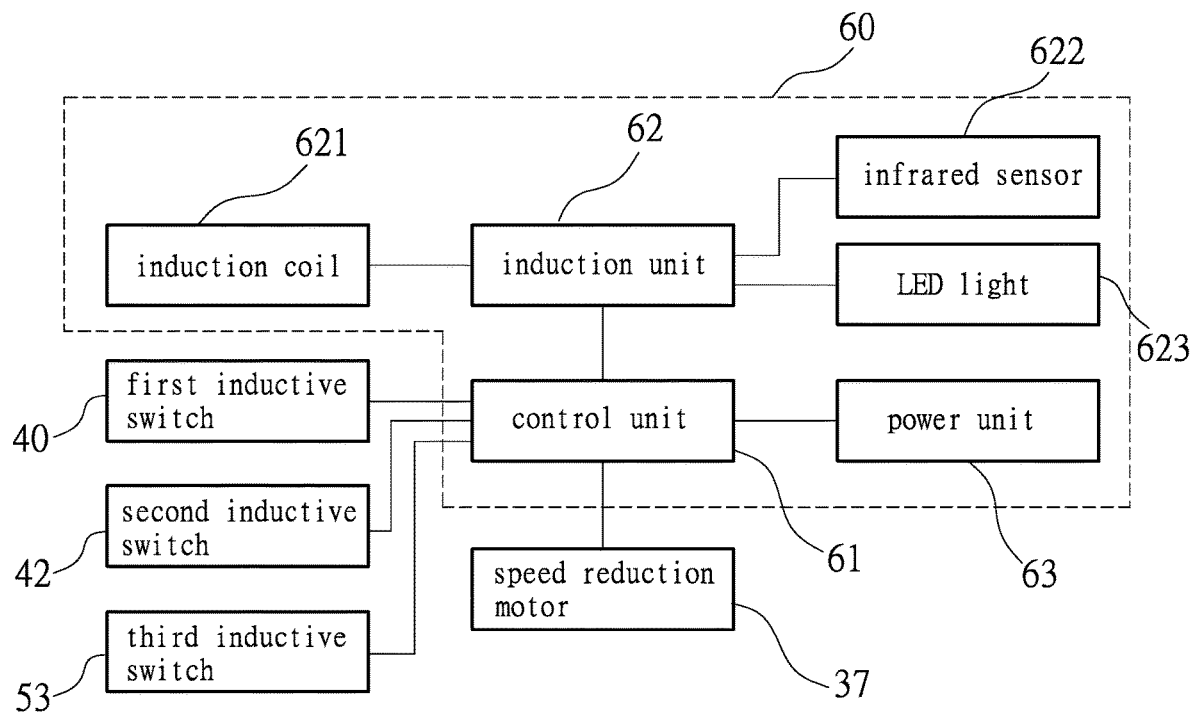
FIG. 7 is a block diagram of the control circuit device of the present invention.
Figure 8:
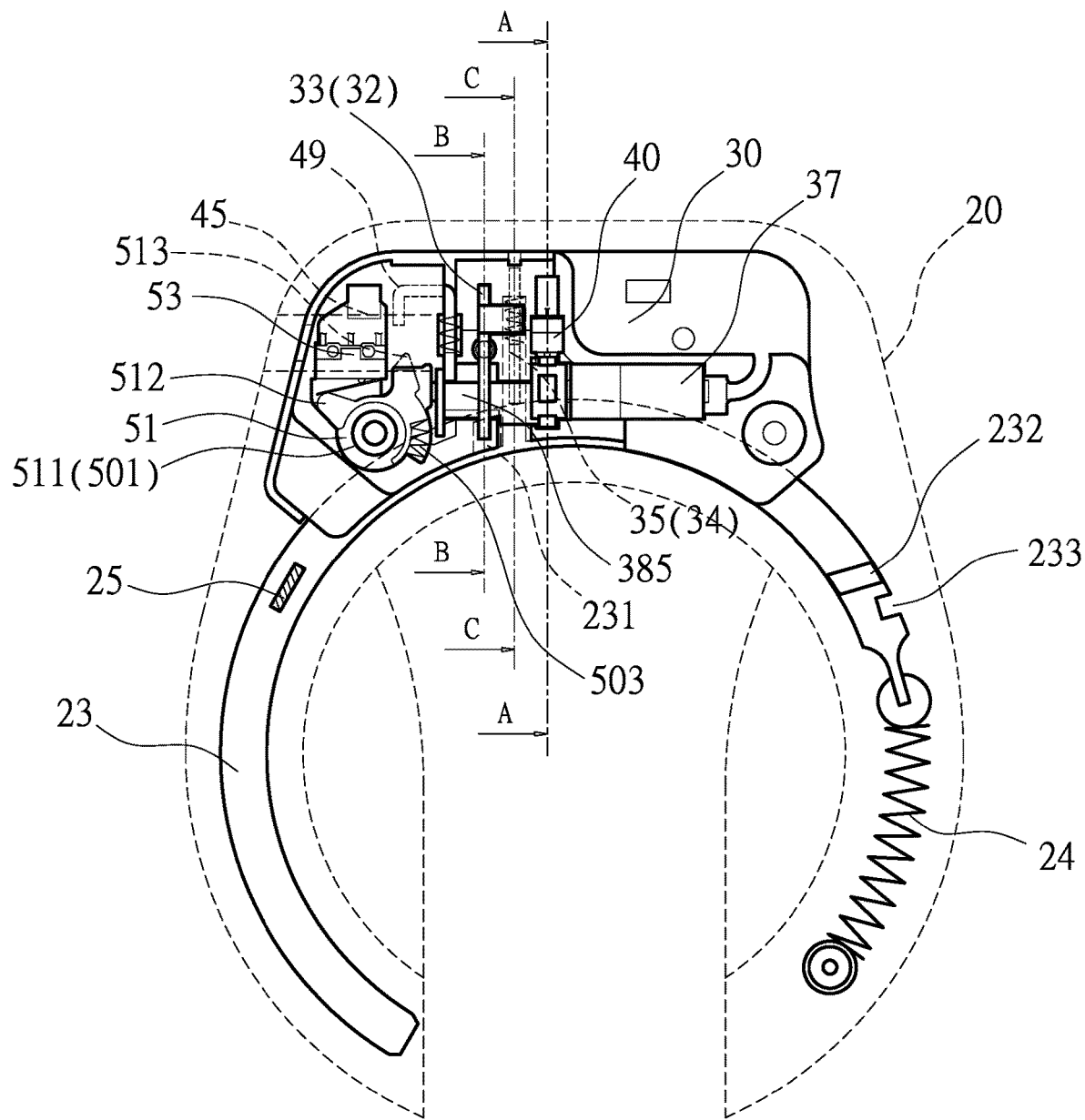
FIG. 8 is a front planar view of the present invention in an unlockable state.

Embodiments of the present invention will now be described, by way of example only, with reference to the accompanying drawings.

Referring to FIGS. 4 to 16, a bicycle inductive lock according to an embodiment of the present invention comprises a housing 20, a lock body 30, and a control circuit device 60.

The housing 20 has an accommodating portion 21 recessed in an upper section and an annular rail portion 22 recessed in a lower section. The accommodating portion 21 is in communication with the rail portion 22. A lower end of the rail portion 22 has an opening 221. An annular latch 23 and a tension spring 24 are disposed in the rail portion 22. The annular latch 23 has a first engaging groove 231, a second engaging groove 232, a third engaging groove 233, and a linking handle 25. The first engaging groove 231 and the second engaging groove 232 are disposed axially, respectively. The third engaging groove 233 is disposed radially. The tension spring 24 has one end coupled to the annular latch 23 and another end coupled to the rail portion 22, so that the tension spring 24 is elastically stretched and the annular latch 23 is slidable in the rail portion 22. A back cover 26 is provided to cover the accommodating portion 21 and the rail portion 22 of the housing 20, so that the annular latch 23 won't disengage from the rail portion 22.

The lock body 30 is disposed in the accommodating portion 21. A lower end of the lock body 30 is formed with an annular groove 31 corresponding to the rail portion 22 for the passing of the annular latch 23. The lock body 30 includes a first slot 32 for accommodating a first baffle 33. The first baffle 33 can be moved left and right in a lateral direction of the annular groove 31. The first slot 32 is provided with a first circular groove 321 defined in the front of the lock body 30. The first baffle 33 has a recess 331 corresponding to the first circular groove 321. Another side of the first baffle 33, opposite to the recess 331, has a lower protrusion 332. The side having the recess 331 of the first baffle 33 is provided with an L-shaped bent lateral extension plate 333. The first baffle 33 is provided with a first through hole 334. The first through hole 334 has an inner flange 335. A spring 322 is disposed between the first circular groove 321 and the recess 331 to support the first baffle 33 for the lower protrusion 332 to extend out of the annular groove 31, so that the lower protrusion 332 is elastically pressed against the annular latch 23 to be engaged in the first engaging groove 231 or the second engaging groove 232. A second slot 34 for accommodating a second baffle 35 is disposed at one side of the first slot 32. The second baffle 35 can be moved up and down in the top direction of the annular groove 31. A lower end of the second slot 34 is in communication with the annular groove 31. The second slot 34 is provided with a second circular groove 341 that is vertically parallel to the second slot 34. The second baffle 35 is provided with a second through hole 351 corresponding to the second circular groove 341. A spring 342 is disposed in the second circular groove 341. The spring 342 leans against a lower end of the second through hole 351. The second baffle 35 is pressed against the annular latch 23 and can be engaged in the third engaging groove 233. The second baffle 35 has an upper notch 352 corresponding to the lateral extension plate 333 and a lower notch 353 under the upper notch 352. The second baffle 35 is provided with an upper end flange 354 opposite to the upper notch 352. A motor accommodating groove 36 for accommodating a speed reduction motor 37 is disposed at one side of the second slot 34 away from the first slot 32. A front end of the speed reduction motor 37 is provided with a rotatable lever 38. The lever 38 passes through the second baffle 35 and the first baffle 33. The lever 38 includes an angle control block 381 and an eccentric paddle 385. The angle control block 381 has a first side protrusion 382, a second side protrusion 383 and a third side protrusion 384 that are arranged radially. The eccentric paddle 385 has a wide section 386, a narrow section 387, and a rotating shaft 388. The wide section 386 is inserted through the lower notch 353 of the second baffle 35. The narrow section 387 is inserted through the first through hole 334 of the first baffle 33. A first groove 39 for accommodating a first inductive switch 40 is disposed between the second slot 34 and the motor accommodating groove 36. The first inductive switch 40 is located above the angle control block 381 of the lever 38 for commanding the first side protrusion 382, the second side protrusion 383 or the third side protrusion 384 to touch or not to touch the first inductive switch 40. A second groove 41 for accommodating a second inductive switch 42 is disposed on the back of the lock body 30. The second inductive switch 42 is located under the upper end flange 354 of the second baffle 35 for commanding the upper end flange 354 to touch or not to touch the second inductive switch 42. A third slot 43 for accommodating a shaft plate member 44 is disposed at another side of the first slot 32 away from the second slot 34. The shaft plate member 44 is composed of two symmetrical shaft plates 441. The two shaft plates 441 have a pair of arc notches 442. The rotating shaft 388 of the lever 38 is pivotally disposed between the pair of arc notches 442. A receiving hole 45 for receiving an insertion head 47 of a steel cable 46 is defined in one side of the lock body 30. One side of the upper section of the housing 20 is formed with a perforation 201 communicating with the accommodating portion 21. The receiving hole 45 corresponds to the perforation 201. A front end of the insertion head 47 has a tapered surface 471 and a shaft groove 472. An inverse U-shaped groove 48 for accommodating an inverse U-shaped baffle 49 is disposed at the side of the first slot 32 away from the second slot 34. The inverse U-shaped baffle 49 can be moved up and down in the inverse U-shaped groove 48. The inverse U-shaped baffle 49 has a first end edge 491 at one end and a second end edge 492 at another end. The first end edge 491 leans against the narrow section 387 of the eccentric paddle 385. The receiving hole 45 is in communication with the inverse U-shaped groove 48. The second end edge 492 is located above the insertion head 47. A lateral protruding plate 493 is disposed below the first end edge 491. The inverse U-shaped groove 48 has an enlarged groove 481 parallel to the first end edge 491 and located above the lateral protruding plate 493. A spring 482 is disposed in the enlarged groove 481 to support the lateral protruding plate 493, so that the second end edge 492 extends into the receiving hole 45 to elastically press against the insertion head 47 for the second end edge 492 to be engaged or not to be engaged in the shaft groove 472 of the insertion head 47. The lock body 30 further has a third groove 50. The third groove 50 is provided with a circular post 501 for connecting a rotating member 51 having a shaft hole 511. The third groove 50 is disposed under the receiving hole 45. The third groove 50 is in communication with the receiving hole 45. An inner side of the third groove 50 is provided with a stop wall 502. One side of the rotating member 51 is provided with a left raised portion 512. Another side of the rotating member 51 is provided with a right raised portion 513 and a stepped edge 514 below the right raised portion 513. A spring 503 is disposed between the stepped edge 514 and the stop wall 502. A fourth groove 52 for accommodating a third inductive switch 53 is disposed above the third groove 50. The spring 503 elastically supports the rotating member 51 to rotate, so that the right raised portion 513 is to be engaged or not to be engaged in the receiving hole 45, and the left raised portion 512 is configured to touch or not to touch the third inductive switch 53. A cover 54 is provided to close all the slots and grooves of the lock body 30, so that the first baffle 33, the spring 322, the first inductive switch 40, the shaft plate member 44, the inverse U-shaped baffle 49, the spring 482, the third inductive switch 53, the rotating member 51, the spring 503 and the lever 38 are not exposed. A back plate 55 is configured to close the back of the lock body 30, so that the second inductive switch 42 is not exposed.

The control circuit device 60 includes a control unit 61, an induction unit 62, a power unit 63, and a key fob 64. The induction unit 62 has an induction coil 621, an infrared sensor 622, and an LED light 623. The induction unit 62 and the power unit 63 are electrically connected to the control unit 61. The control unit 61 is electrically connected to the first inductive switch 40, the second inductive switch 42, the third inductive switch 53 and the speed reduction motor 37, respectively. The control unit 61 is hidden in the housing 20. The induction unit 62 is disposed at one side of a back cover 26. The power unit 63 supplies power to the speed reduction motor 37, the first inductive switch 40, the second inductive switch 42, the third inductive switch 53, the control unit 61, and the induction unit 62. The key fob 64 is configured to generate induction with the induction coil 621 to transmit a signal for the control unit 61 to drive the speed reduction motor 37. With the above configuration, the bicycle inductive lock can sense the signal and drive the eccentric paddle to touch the first baffle, the second baffle and the inverse U-shaped baffle to form a lockable state or unlocked state, and can cooperate with the steel cable when in use to achieve the effect of locking and unlocking.

Figure 9:
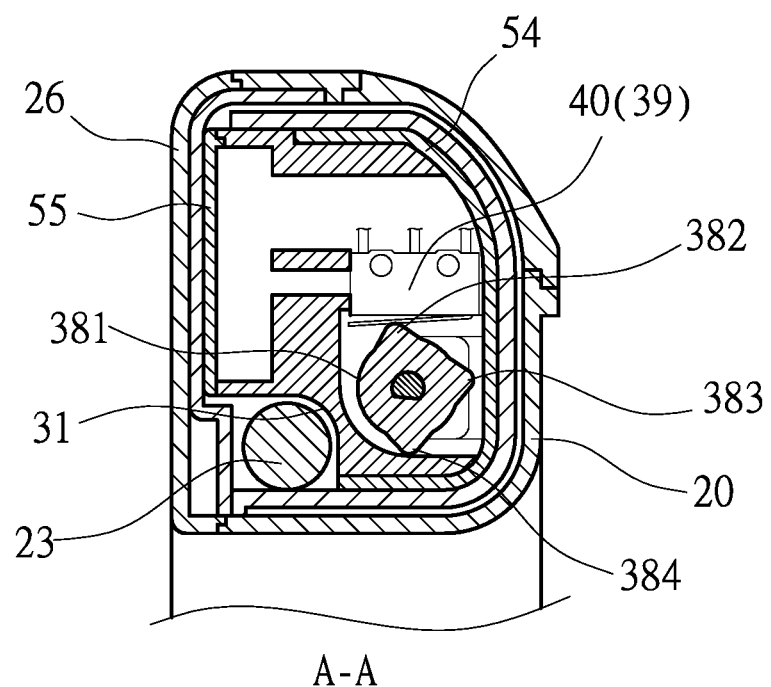
FIG. 9 is a partial cross-sectional view taken along line A-A of FIG. 8.
Figure 10:
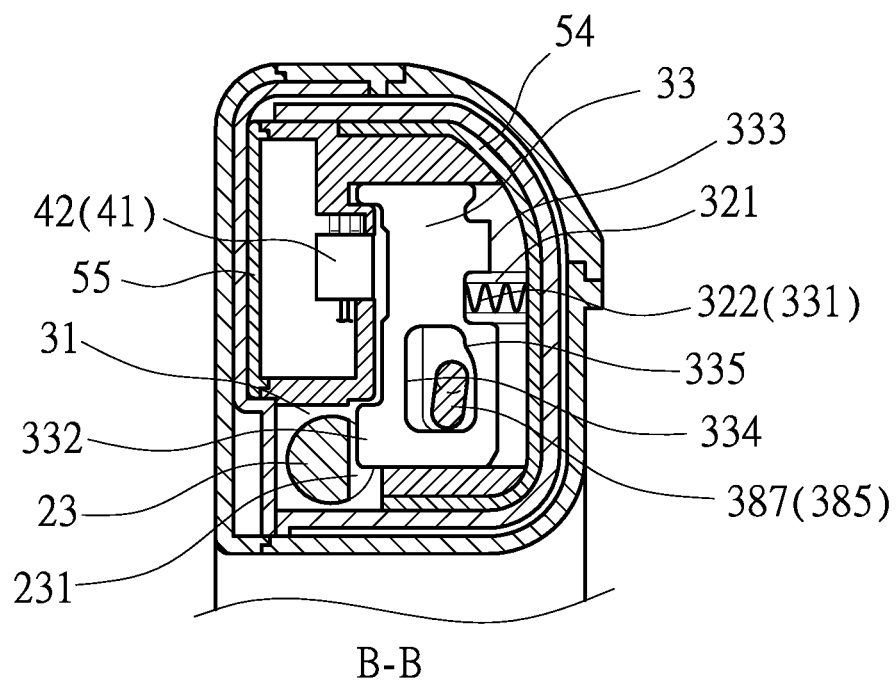
FIG. 10 is a partial cross-sectional view taken along line B-B of FIG. 8.
Figure 11:
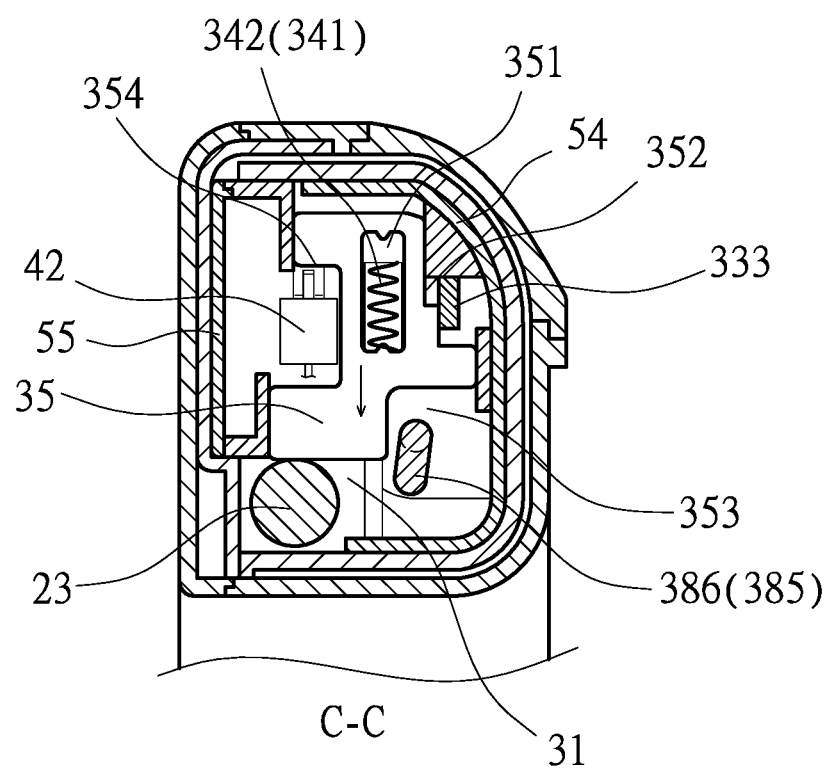
FIG. 11 is a partial cross-sectional view taken along line C-C of FIG. 8.

The assembly and function of the above embodiment are described in detail as follows: Referring to FIGS. 4 to 11, the induction between the key fob 64 and the induction coil 621 of the present invention is mainly based on wireless signals (e.g., RFID, NFC, Bluetooth, etc.). RFID inductive electronic tag data, NFC and Bluetooth transmission data are conventional technologies, and will not be described hereinafter. Taking the RFID inductive electronic tag data as an example, when the induction data of the electronic tag received by the control unit 61 is wrong, the LED light 623 emits a red light signal. On the contrary, if the induction data of the electronic tag received by the control unit 61 is correct, the control unit 61 can activate the speed reduction motor 37 to perform locking or unlocking, and the LED light 623 emits a green light signal. Before locking, the first side protrusion 382 of the angle control block 381 is pressed against the first inductive switch 40 (as shown in FIG. 9), and the eccentric paddle 385 is eccentric toward the lower end of the lock body 30. The first baffle 33 is supported by the spring 322 (as shown in FIG. 10), so that the lower protrusion 332 extends out of the annular groove 31 and is engaged in the first engaging groove 231 of the annular latch 23, and the annular latch 23 cannot be pulled to be in an unlockable state, and the effect of erroneous locking can be avoided. The second baffle 35 is supported by the spring 342 (as shown in FIG. 11), so that the lower end of the second baffle 35 also extends out of the annular groove 31 to lean against the edge of the annular latch 23, and the upper end flange 354 of the second baffle 35 doesn't touch the second inductive switch 42. The rotating member 51 is supported by the spring 503, so that the left raised portion 512 doesn't touch the third inductive switch 53, and the right raised portion 513 extends into the receiving hole 45.

Figure 12:
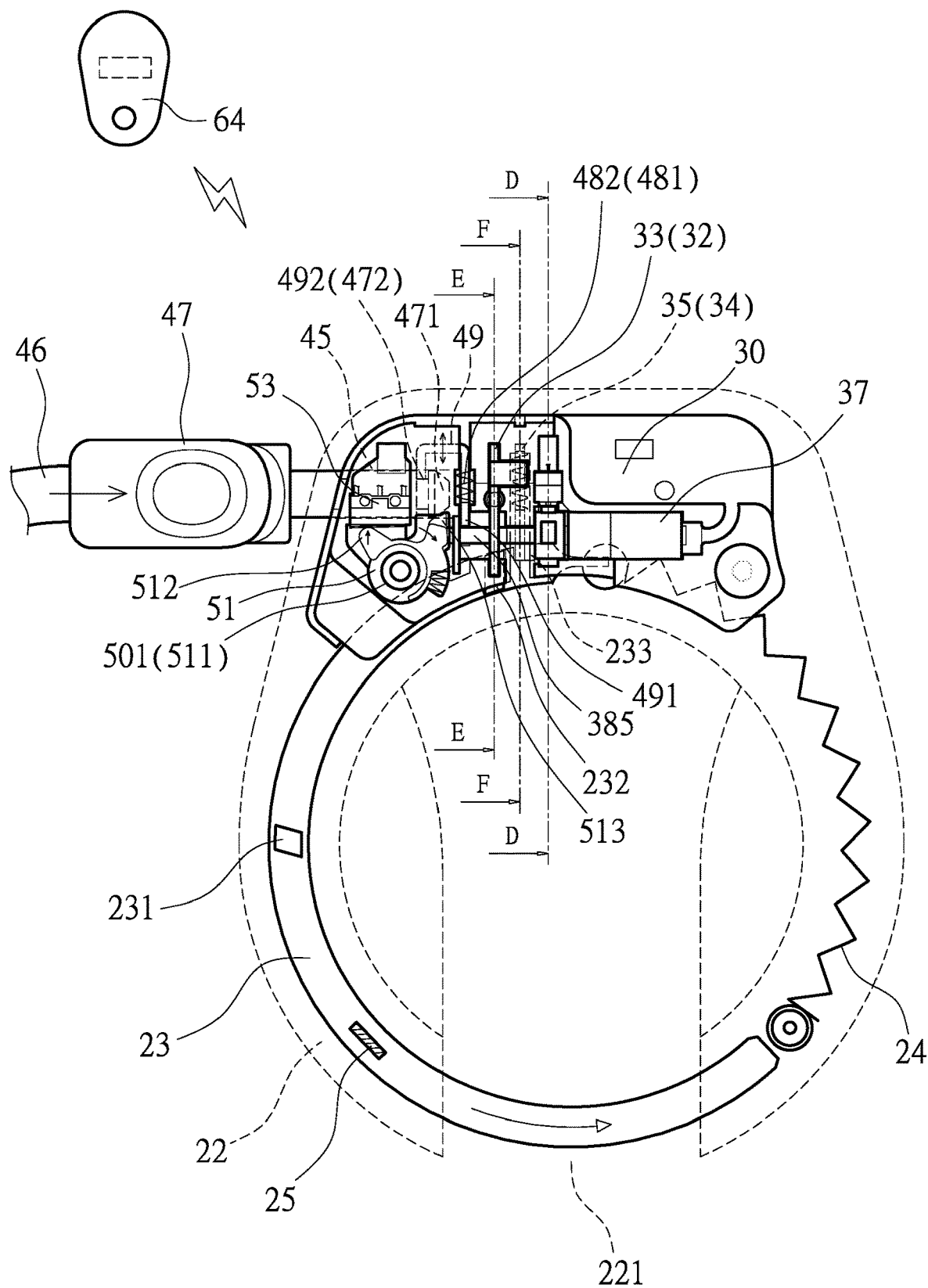
FIG. 12 is a front planar view of the present invention in a lockable state.
Figure 13:
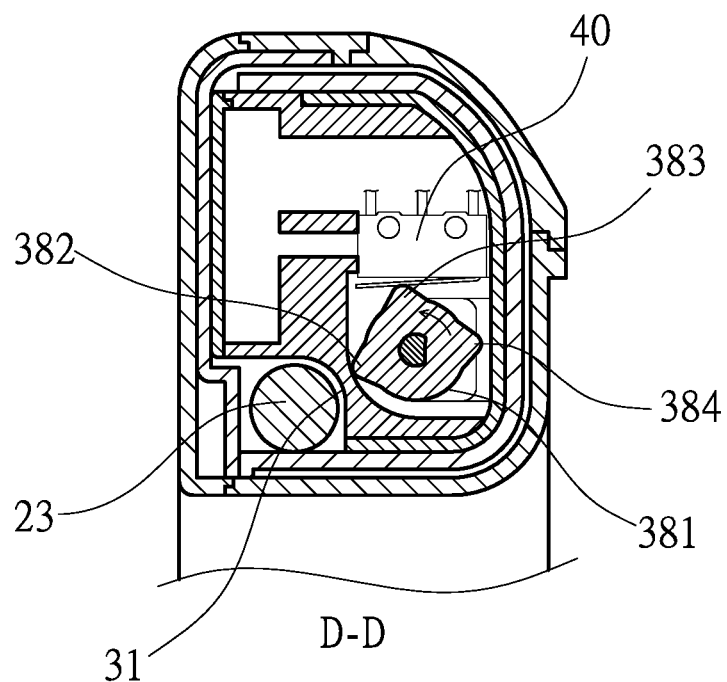
FIG. 13 is a partial cross-sectional view taken along line D-D of FIG. 12.
Figure 14:
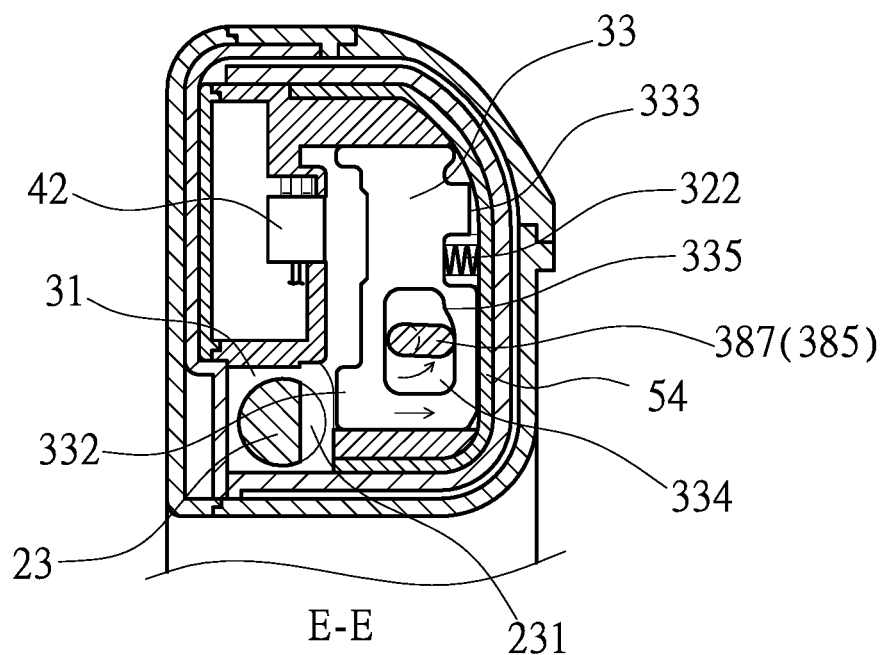
FIG. 14 is a partial cross-sectional view taken along line E-E of FIG. 12.
Figure 15:
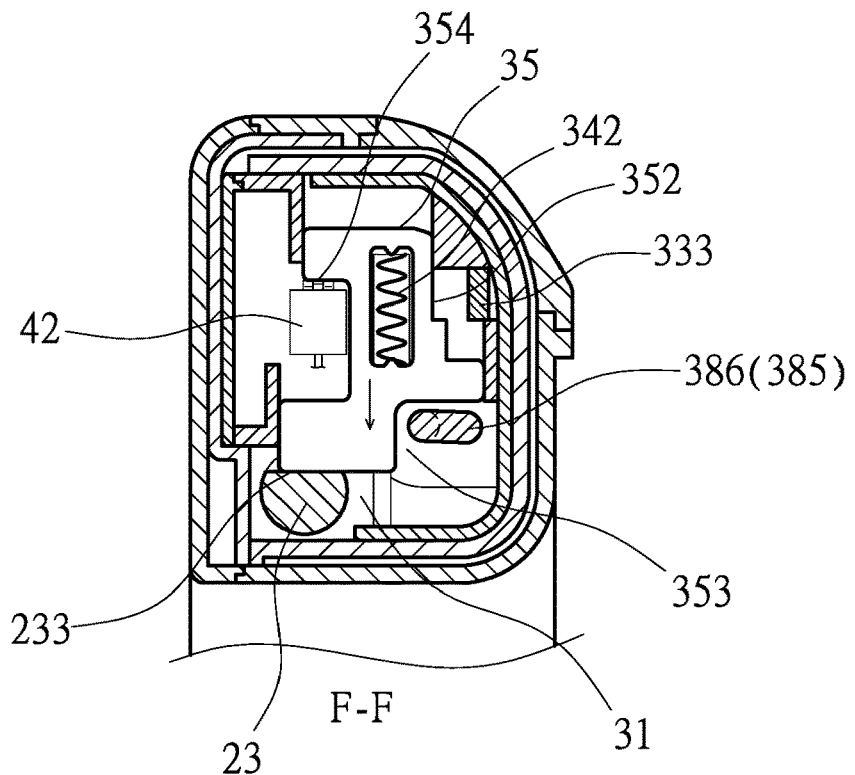
FIG. 15 is a partial cross-sectional view taken along line F-F of FIG. 12.
Figure 16:
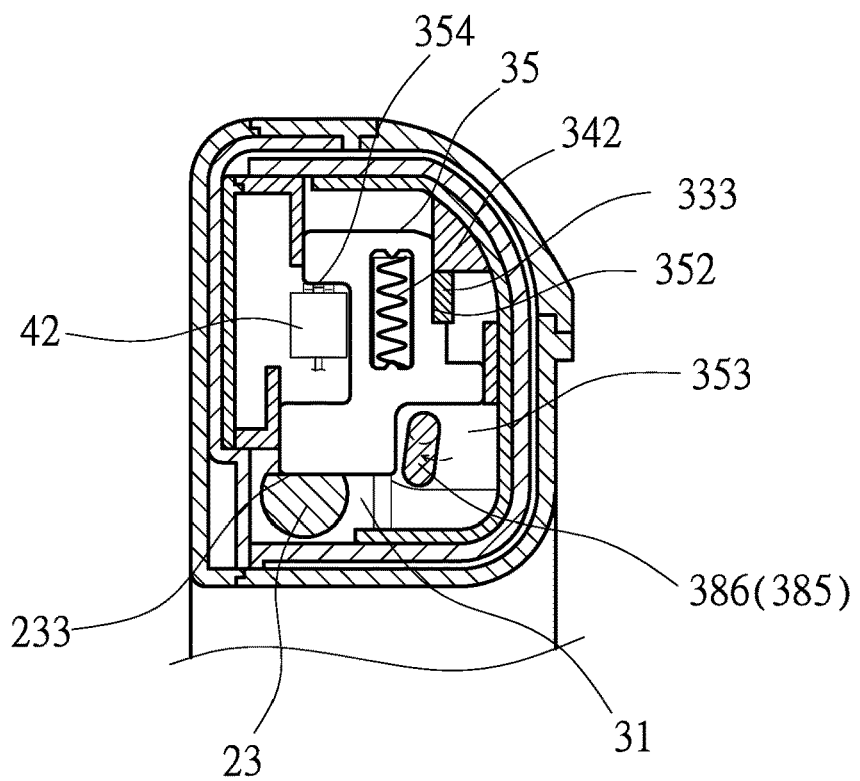
FIG. 16 is a schematic cross-sectional view of the present invention, showing that the lever is restored to the initial position.
Figure 17:
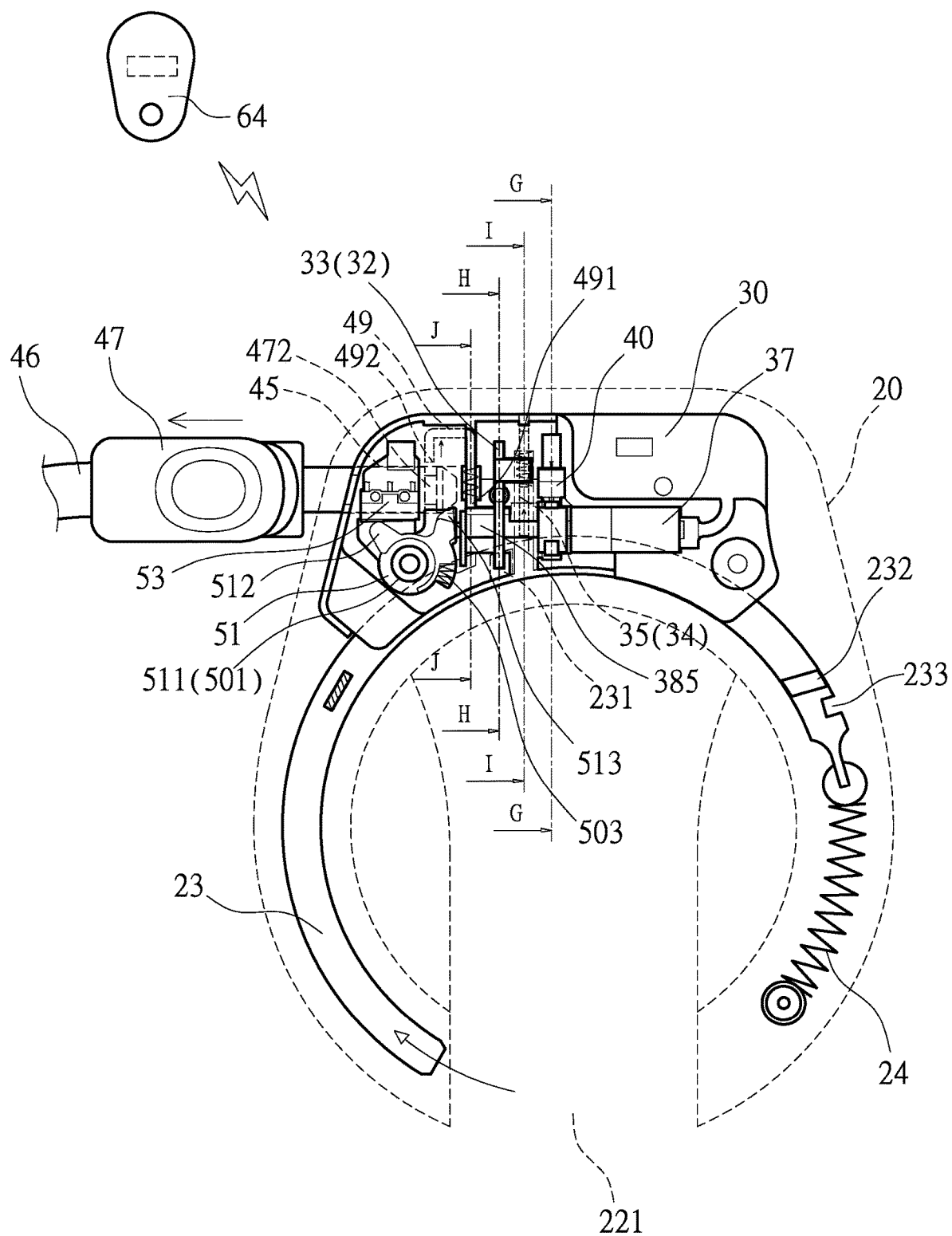
FIG. 17 is a front planar view of the present invention in an unlocked state.

Referring to FIGS. 4-7 and 12-16, for locking, the user uses the key fob 64 to approach the induction unit 62 (the infrared sensor 622 and the induction coil 621). The infrared sensor 622 can sense and provide a signal to wake up the control unit 61, and the power unit 63 is started to supply power. The induction coil 621 obtains a signal and send it to the control unit 61, and detects the current states of the first, second, and third inductive switches 40, 42, 53, and then drives the speed reduction motor 37 to rotate, so that the angle control block 381 is rotated from the first side protrusion 382 to the second side protrusion 383 to touch the first inductive switch 40 (as shown in FIG. 13). In this way, the control unit 61 can receive the signal of the first inductive switch 40 to stop the rotation of the speed reduction motor 37. At this time, the narrow section 387 of the eccentric paddle 385 is turned to the horizontal position in the first through hole 334 to press the first baffle 33 against the elastic force of the spring 322 (as shown in FIG. 14), such that the lower protrusion 332 of the first baffle 33 is disengaged from the first engaging groove 231 of the annular latch 23 to be in a lockable state. The lockable state is maintained for a set time (for example, 10 seconds or 15 seconds), and the linking handle 25 can be pulled to move the annular latch 23 along the rail portion 22 within the set time. The tension spring 24 is stretched, and the annular latch 23 extends out of the rail portion 22 to close the opening 221 at the lower end. On the contrary, if the set time is exceeded, the control unit 61 drives the speed reduction motor 37 to turn reversely, and the angle control block 381 is restored to the initial angle, so that the lower protrusion 332 of the first baffle 33 is engaged in the first engaging groove 231 of the annular latch 23 again to be in an unlockable state. When the third engaging groove 233 of the annular latch 23 is moved to the position of the second baffle 35, the second baffle 35 is supported by the spring 342 so that the lower end of the second baffle 35 is engaged in the third engaging groove 233 (as shown in FIG. 15), and the annular latch 23 is positioned stably in a locked state. At the same time, the second engaging groove 232 of the annular latch 23 is moved to the position of the first baffle 33, and the upper end flange 354 of the second baffle 35 presses the second inductive switch 42 to generate a signal to the control unit 61, and the speed reduction motor 37 is turned reversely to the initial position (as shown in FIG. 16), so that the first side protrusion 382 presses the first inductive switch 40 again, and the first baffle 33 is supported by the spring 322, and the lower protrusion 332 is engaged in the second engaging groove 232 to complete the locked state. The lateral extension plate 333 of the first baffle 33 is engaged in the upper notch 352 of the second baffle 35. When a thief wants to pry the second baffle 35 with a sharp tool, the sharp tool will be blocked by the lateral extension plate 333, thereby providing a double anti-theft effect. When the steel cable 46 is used to increase the anti-theft mechanism, the insertion head 47 of the steel cable 46 is inserted through the perforation 201 into the receiving hole 45 of the lock body 30 (as shown in FIG. 12). When the insertion head 47 is inserted into the receiving holes 45, the second end edge 492 of the inverse U-shaped baffle 49 in the receiving hole 45 is pushed out of the receiving hole 45 by the tapered surface 471 until the shaft groove 472 of the insertion head 47 reaches the position of the second end edge 492. The spring 482 is elastically pressed against the lateral protruding plate 493, so that the second end edge 492 of the inverse U-shaped baffle 49 is elastically pressed to be engaged in the shaft groove 472 to secure the insertion head 47. At the time of insertion, the insertion head 47 pushes the right raised portion 513 of the rotating member 51 to disengage from the receiving hole 45. The rotating member 51 is rotated about the circular post 501, and the left raised portion 512 is pressed against the third inductive switch 53 to provide a signal for using the steel cable 46 to the control unit 61. The steel cable 46 is used as an anti-theft mechanism, which can be used at any time or can be used alone in an unlockable state. After the set time, the control unit 61 can be in a sleep (standby) state to save power consumption. If the steel cable 46 is not used after the set time, the control unit 61 is in a sleep (standby) state automatically.

Figure 18:
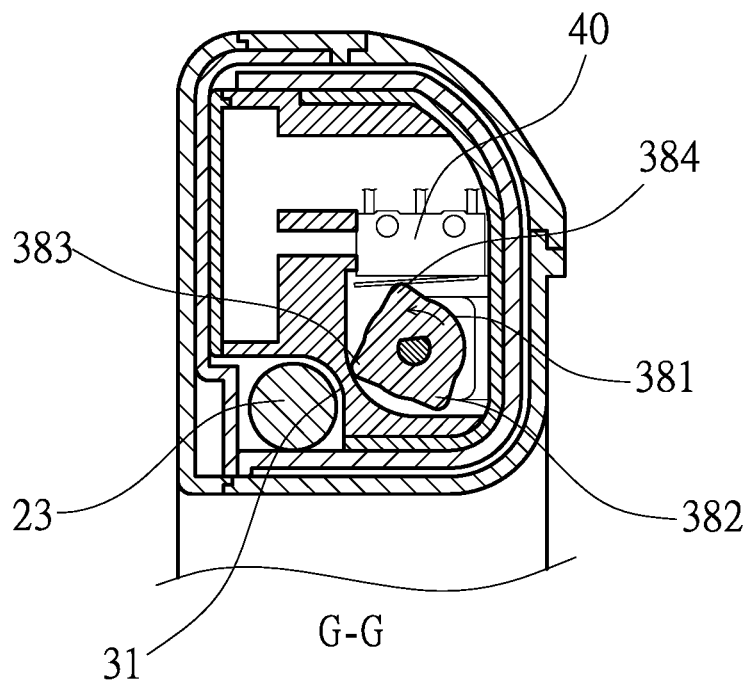
FIG. 18 is a partial cross-sectional view taken along line G-G of FIG. 17.
Figure 19:
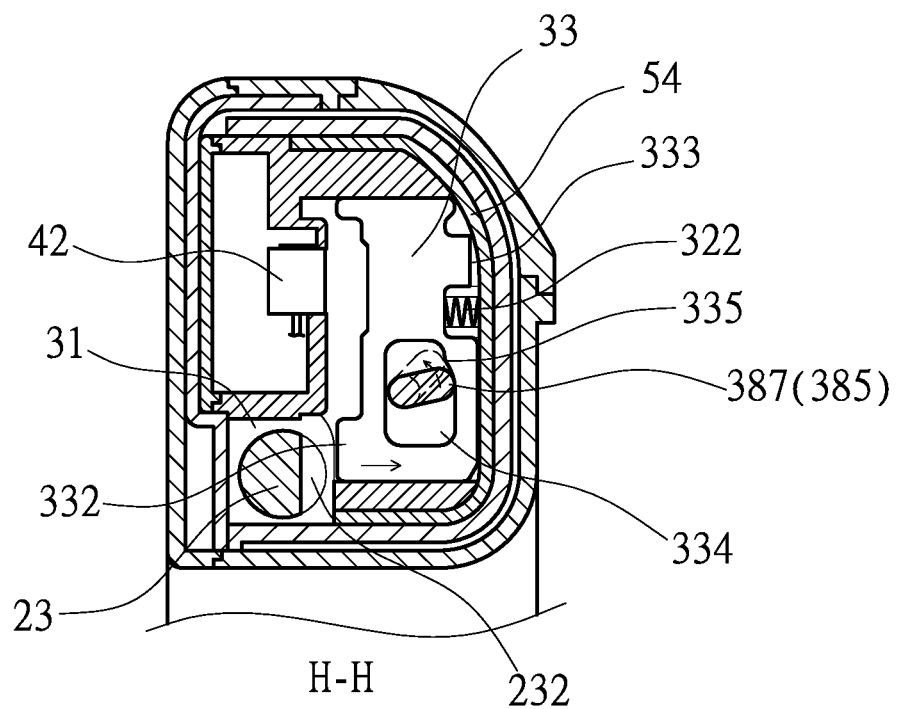
FIG. 19 is a partial cross-sectional view taken along line H-H of FIG. 17.
Figure 20:
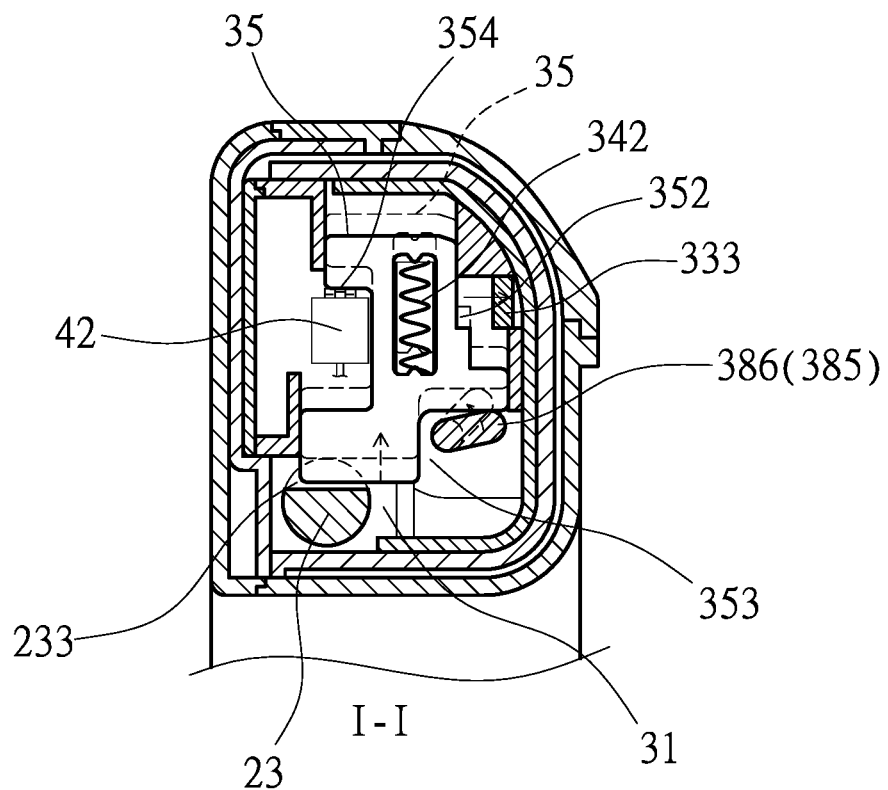
FIG. 20 is a partial cross-sectional view taken along line I-I of FIG. 17.
Figure 21:
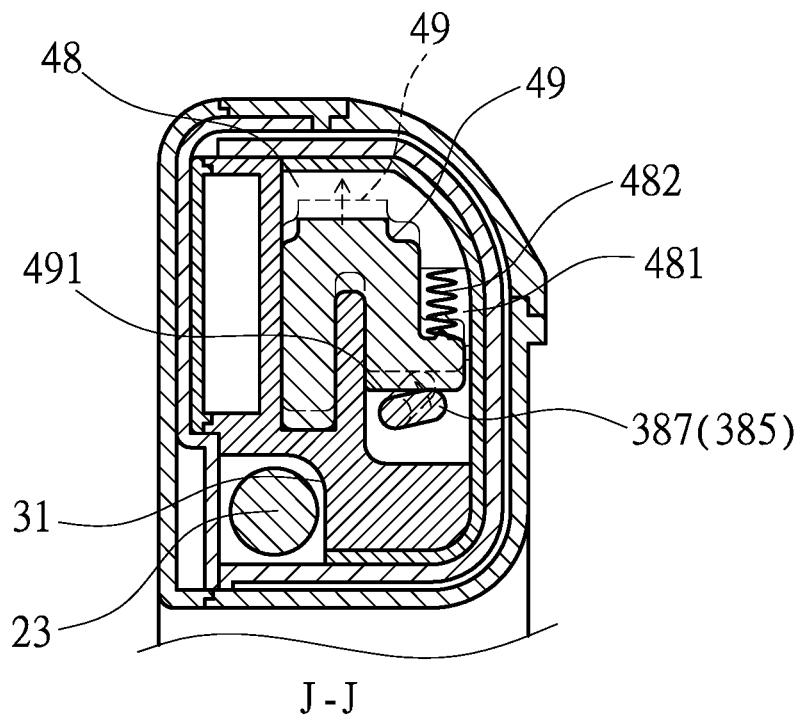
FIG. 21 is a partial cross-sectional view taken along line J-J of FIG. 17.

Referring to FIGS. 4-7 and 12-16, for unlocking, the user uses the key fob 64 to approach the induction unit 62 (the infrared sensor 622 and the induction coil 621). The infrared sensor 622 can sense and provide a signal to wake up the control unit 61, and the power unit 63 is started to supply power. The induction coil 621 sends a signal to the control unit 61, and detects the current states of the first, second, and third inductive switches 40, 42, 53. If the second inductive switch 42 is pressed by the upper end flange 354 of the second baffle 35 or the third inductive switch 53 is pressed by the left raised portion 512 of the rotating member 51, the control unit 61 judges that the bicycle inductive lock is in a locked state and drives the speed reduction motor 37 to rotate, so that the third side protrusion 384 of the angle control block 381 touches the first inductive switch 40 (as shown in FIG. 18). In this way, the control unit 61 can receive the signal of the first inductive switch 40 to stop the rotation of the speed reduction motor 37. At this time, the narrow section 387 of the eccentric paddle 385 is turned to the horizontal position in the first through hole 334 to press the first baffle 33 against the elastic force of the spring 322. The lower protrusion 332 of the first baffle 33 is disengaged from the second engaging groove 232 of the annular latch 23 (as shown in FIG. 19). At the same time, the lateral extension plate 333 is disengaged from the upper notch 352 of the second baffle 35 to facilitate the movement of the second baffle 35 (as shown in FIG. 20). The eccentric paddle 385 continues to rotate. The wide section 386 and the narrow section 387 of the eccentric paddle 385 are at an upward yaw angle. The wide section 386 leans against the lower notch 353 of the second baffle 35 (as shown in FIG. 20), so that the second baffle 35 is moved upwardly against the elastic force of the spring 342. In the above process, the narrow section 387 continues to deflect upwardly in the first through hole 334 of the first baffle 33, and the narrow section 387 leans against the inner flange 335 to continuously resist the elastic force of the spring 322, preventing the first baffle 33 from being engaged in the second engaging groove 232 to block the annular latch 23 from unlocking and retracting. At this time, the lower end of the second baffle 35 is disengaged from the third engaging groove 233 of the annular latch 23, and the annular latch 23 is elastically retracted by the tension spring 24 from the opening 221 to the rail portion 22 until the third side protrusion 383 of the angle control block 381 is rotated to touch the first inductive switch 40, and the speed reduction motor 37 immediately stops rotating. At this time, although the narrow section 387 is at an upward angle in the first through hole 334 of the first baffle 33, the first baffle 33 leans against the annular latch 23, but the annular latch 23 has been retracted and unlocked. The first engaging groove 231 of the annular latch 23 corresponds to the position of the lower protrusion 332 of the first baffle 33, and the second baffle 35 is moved upwardly, and the lateral extension plate 333 cannot be engaged in the upper notch 352. At the same time, the narrow section 387 deflects upwardly to lean against the lower end of the first end edge 491 of the inverse U-shaped baffle 49 (as shown in FIG. 21), and the inverse U-shaped baffle 49 is moved upwardly against the elastic force of the spring 482, and the second end edge 492 is disengaged from the shaft groove 472 of the insertion head 47, so that the insertion head 47 of the steel cable 46 is in an unlocked state. There is no time limit for this state, so that the insertion head 47 is disengaged from the receiving hole 45. Then, after the insertion head 47 is pulled away, the rotating member 51 is elastically supported by the spring 503, and the rotating member 51 is rotated about the circular post 501, so that the right raised portion 513 extends into the receiving hole 45, and the left raised portion 512 does not touch the third inductive switch 53. A signal that the steel cable 46 has been disengaged is sent to the control unit 61. The speed reduction motor 37 is reversely rotated to return the first side protrusion 382 of the angle control block 381 to the unlockable state, so that the lower protrusion 332 of the first baffle 33 is engaged in the first engaging groove 231. It is worth mentioning that when the bicycle inductive lock is applied to an electric bicycle, the power unit 63 may be connected to the battery of the electric bicycle to supply power, which can simplify the structure.

It is worth mentioning that when the power is supplied for the first time or after a power failure, the control unit 61 will start the power unit 63 to supply power for driving the speed reduction motor 37 to rotate. The speed reduction motor 37 firstly rotates at a small angle to detect whether the first side protrusion 382 correctly touches the first inductive switch 40, thereby achieving the effect of detecting and correcting the position. The shaft plate member may be an integral shaft plate having a central circular hole. The circular hole is pivotally connected with the rotating shaft of the lever, which belongs to the creative scope of the equivalent structure of the present invention.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A bicycle inductive lock, comprising a housing, a lock body, and a control circuit device;

the housing having an accommodating portion recessed in an upper section and a rail portion recessed in a lower section, a lower end of the rail portion having an opening, an annular latch and a tension spring being disposed in the rail portion, the annular latch having a first engaging groove, a second engaging groove, a third engaging groove and a linking handle, the first engaging groove and the second engaging groove being disposed axially respectively, the third engaging groove being disposed radially, the tension spring having one end coupled to the annular latch and another end coupled to the rail portion, a back cover being configured to cover the housing;

the lock body being disposed in the accommodating portion, a lower end of the lock body being formed with an annular groove corresponding to the rail portion, the lock body including a first slot for accommodating a first baffle, the first baffle being movable horizontally in a lateral direction of the annular groove; one side of the first baffle, corresponding to the annular groove, having a lower protrusion, the first baffle being provided with a first through hole, the first through hole having an inner flange, the lower protrusion being elastically pressed against the annular latch to be engaged in the first engaging groove or the second engaging groove; a second slot for accommodating a second baffle being disposed at one side of the first slot, the second baffle being movable vertically in a top direction of the annular groove; a lower end of the second slot being in communication with the annular groove, the second baffle being pressed against the annular latch to be engaged in the third engaging groove; one side of the second baffle, away from the annular groove, having a lower notch at a lower end, another side of the second baffle, opposite to the lower notch, being provided with an upper end flange; a motor accommodating groove for accommodating a speed reduction motor being disposed at one side of the second slot away from the first slot, a front end of the speed reduction motor having a rotatable lever, the lever passing through the second baffle and the first baffle; the lever including an angle control block and an eccentric paddle, the angle control block having a first side protrusion, a second side protrusion and a third side protrusion that are arranged radially, the eccentric paddle having a wide section and a narrow section, the wide section being inserted through the lower notch of the second baffle, the narrow section being inserted through the first through hole of the first baffle; a first groove for accommodating a first inductive switch being disposed between the second slot and the motor accommodating groove, the first inductive switch being located above the angle control block for commanding the first side protrusion, the second side protrusion or the third side protrusion to touch or not to touch the first inductive switch; a second groove for accommodating a second inductive switch being disposed on a back of the lock body, the second inductive switch being located under the upper end flange of the second baffle for commanding the upper end flange to touch or not to touch the second inductive switch;

the control circuit device including a control unit, an induction unit, a power unit and a key fob, the induction unit and the power unit being electrically connected to the control unit respectively, the control unit being electrically connected to the first inductive switch, the second inductive switch and the speed reduction motor respectively, the key fob being configured to generate induction with the induction unit for transmitting a signal to the control unit to drive the speed reduction motor to rotate clockwise or counterclockwise.

2. The bicycle inductive lock as claimed in claim 1, wherein the lock body further includes a receiving hole, an inverse U-shaped groove, a third groove and a fourth groove; the receiving hole is configured to receive an insertion head of a steel cable and is defined in one side of the lock body, one side of the upper section of the housing is formed with a perforation communicating with the accommodating portion, the receiving hole corresponds to the perforation, a front end of the insertion head has a tapered surface and a shaft groove; the inverse U-shaped groove is configured to accommodate an inverse U-shaped baffle and is disposed at another side of the first slot away from the second slot, the inverse U-shaped baffle is moved vertically in the inverse U-shaped groove, the inverse U-shaped baffle has a first end edge at one end and a second end edge at another end, the first end edge leans against the narrow section of the eccentric paddle, the receiving hole is in communication with the inverse U-shaped groove, the second end edge is located above the insertion head, the inverse U-shaped baffle is elastically pressed downwardly so that the second end edge extends into the receiving hole to elastically press against the insertion head for the second end edge to be engaged or not to be engaged in the shaft groove of the insertion head; the third groove is pivotally connected with a rotating member, the third groove is disposed under the receiving hole, the third groove is in communication with the receiving hole, one side of the rotating member is provided with a left raised portion, another side of the rotating member is provided with a right raised portion; the fourth groove is configured to accommodate a third inductive switch and is disposed above the third groove, the control unit is electrically connected to the third inductive switch, the right raised portion of the rotating member is elastically pressed to be engaged or not to be engaged in the receiving hole, and the left raised portion is configured to touch or not to touch the third inductive switch.

3. The bicycle inductive lock as claimed in claim 2, wherein the third groove is provided with a circular post, the rotating member has a shaft hole, and the circular post is pivoted to the shaft hole.

4. The bicycle inductive lock as claimed in claim 2, wherein a lateral protruding plate is disposed below the first end edge, the inverse U-shaped groove has an enlarged groove that is parallel to the first end edge and located above the lateral protruding plate, and a spring is disposed in the enlarged groove to support the lateral protruding plate.

5. The bicycle inductive lock as claimed in claim 2, wherein an inner side of the third groove is provided with a stop wall, a stepped edge is disposed below the right raised portion, and a spring is disposed between the stepped edge and the stop wall.

6. The bicycle inductive lock as claimed in claim 1, wherein another side of the first baffle, opposite to the lower protrusion, is provided with an L-shaped bent lateral extension plate, and the second baffle has an upper notch corresponding to the lateral extension plate.

7. The bicycle inductive lock as claimed in claim 1, wherein the first slot is provided with a first circular groove defined in a front of the lock body, the first baffle has a recess corresponding to the first circular groove, and a spring is disposed between the first circular groove and the recess to support the first baffle.

8. The bicycle inductive lock as claimed in claim 1, wherein the second slot is provided with a second circular groove that is vertically parallel to the second slot, the second baffle is provided with a second through hole corresponding to the second circular groove, a spring is disposed in the second circular groove, and the spring leans against a lower end of the second through hole.

9. The bicycle inductive lock as claimed in claim 1, wherein a distal end of the narrow section of the eccentric paddle is provided with a rotating shaft, the lock body further has a third slot for accommodating a shaft plate member, the third slot is disposed at another side of the first slot away from the second slot, the shaft plate member is composed of two symmetrical shaft plates, the two shaft plates have a pair of arc notches, and the rotating shaft is pivoted in the pair of arc notches.

10. The bicycle inductive lock as claimed in claim 1, wherein the induction unit has an induction coil, an infrared sensor, and an LED light.

\* \* \* \* \*